United States Patent [19]

Varner et al.

[11] 4,167,166

[45] Sep. 11, 1979

[54] HOT AIR VAPORIZATION SYSTEM FOR AN INTERNAL COMBUSTION ENGINE

[75] Inventors: William L. Varner; Billy R. Willis, both of Scottsdale, Ariz.

[73] Assignee: Mileage Research, Ltd., Phoenix, Ariz.

[21] Appl. No.: 841,314

[22] Filed: Oct. 11, 1977

[51] Int. Cl.² ............................................. F02M 31/00
[52] U.S. Cl. .............................. 123/122 D; 123/124 A; 123/124 R; 261/63; 123/122 A; 123/122 AA; 123/119 D
[58] Field of Search .......... 123/122 D, 124 R, 124 A, 123/119 D, 119 DB, 122 A, 122 AA; 261/63; 48/180 A

[56] References Cited

U.S. PATENT DOCUMENTS

| | | | |
|---|---|---|---|
| 2,326,598 | 8/1943 | Acosta | 123/124 R |
| 3,414,242 | 12/1968 | Bouteleux | 123/124 R |
| 3,473,522 | 10/1969 | Bailey | 123/122 D |
| 3,919,988 | 1/1971 | Bun | 123/119 D |
| 3,943,900 | 3/1976 | Primrose | 123/124 R |

FOREIGN PATENT DOCUMENTS

2361505  6/1975  Fed. Rep. of Germany ...... 123/119 D

*Primary Examiner*—Ronald H. Lazarus

*Attorney, Agent, or Firm*—Krass & Young

[57] ABSTRACT

An arrangement for inducting auxiliary heated air into the intake manifold of a carbureted internal combustion engine in an efficient, optimal manner, which achieves substantially complete vaporization of the fuel with a relatively low volume of auxiliary air. The arrangement includes an air induction tube receiving filtered air, which tube is connected to a heater tube disposed within the interior of the exhaust system or to a hot water heat exchanger to heat the auxiliary air, which is then inducted into the engine intake manifold via an insulated double wall tube and a metering block which produces a controlled flow of the heated air into a pair of distributor tubes extending from the metering block into branch cavities of the engine intake manifold. Each distributor tube is centered within a respective manifold cavity and is formed with a hole pattern which produces a uniform diffuse flow of the heated air drawn into the intake manifold by the manifold vacuum so as to produce an optimal flow of heated air. The temperature and flow rates are determined for a particular engine configuration by measuring the fuel flow consumed by the engine at idle at various flow rates and temperatures of the inducted air and selecting the optimal flow rate and temperature.

11 Claims, 7 Drawing Figures

HOT AIR VAPORIZATION SYSTEM FOR AN INTERNAL COMBUSTION ENGINE

BACKGROUND OF THE INVENTION

1. Field of the Invention

This invention concerns internal combustion engines and more particularly fuel delivery systems for internal combustion engines which involve the induction of air-fuel mixtures into the engine.

2. Background Discussion

In conventional internal combustion engines of the carbureted type, liquid fuel such as gasoline is partially vaporized and mixed with air to form a fuel-air charge, which is inducted into the engine combustion chamber via the intake manifold. Conventional carburetion has never successfully produced a pure vaporized fuel-air mixture but rather has produced a mixture in the intake manifold of air, vaporized fuel and atomized fuel comprised of liquid droplets entrained or suspended in the flow of the mixture into the engine. Complete vaporization typically does not take place until the mixture has been inducted into the engine cylinders (in a piston engine). This lack of complete vaporization by the carburetor leads to increased carburetor complexity, less efficient engine operation and other operating disadvantages such as carbon build up in the engine etc. due to too rich mixtures being burned in the engine cylinders.

These disadvantages accrue in part from the increased inertia of the fuel in the mixture, i.e., at increased power demands, raw or liquid fuel must be injected into the air stream to quickly increase the amount of fuel in the charge. Such liquid fuel produces overly rich relatively wasteful mixtures which are inducted into the cylinders.

In addition, this requires the added complexity of the accelerator pumps normally incorporated in these carburetors.

The difficulty in achieving proper flow within the intake manifold is also rendered much greater since the inertia of the atomized particles has a tendency to create separation of the atomized fuel from the air flow at bends within the intake manifold and to create too rich or too lean fuel-air proportions at differing points within the intake manifold due to the redistribution of the atomized particles in the air stream. For example, at bends in the intake manifold, the air stream at the outer end of the bend tends to receive a greater proportion of the entrained atomized fuel particles, while those nearer the interior side of the bends receives less fuel. If such bends involve the division of flow to the various cylinders, then the individual cylinders may receive too rich or too lean mixtures, respectively. This then requires the engine to operate at either too rich a mixture overall to insure that all cylinders get an adequately rich mixture or that some cylinders will run too lean increasing temperatures and causing valve burning due to the presence of excess oxygen in the charge.

Liquid fuel may also accumulate within the intake manifold passages due to condensation on the walls and collection of the atomized particles at the outside of the bends of the intake manifold. Since the condensed particles tend to be the heavier molecular weight constituents which are more difficult to vaporize, the condensed or collected vaporized particles may be difficult to revaporize and may have a tendency to form a residue within the intake manifold increasing the restriction flow on the air through the intake manifold and reducing the volumetric efficiency of the engine.

These conditions are particularly aggravated when the engine is cold, prior to the warming of the intake manifold by the various manifold warming devices or the recirculation of exhaust gases. Since a great proportion of driving takes place under cold engine conditions, this has a substantially negative impact on the performance of the engine.

These negative characteristics of the nonvaporized condition of the fuel-air charge downstream of the carburetor have long been recognized but are of more particular concern under present day conditions in which both emissions and fuel economy have become critical design considerations due to the relative high cost of gasoline and governmental regulation of both passenger car fuel economy and emission levels.

It has also long been recognized that heating of the inducted air charge to improve vaporization is possible, but entails a penalty on the efficiency of the engine which would nullify the improvement in engine efficiency and performance characteristics.

This penalty involves a decreased volumetric efficiency of the engine, i.e., the air becoming relatively rarefied as it is heated, less mass is inducted into the cylinders producing a reduced volumetric efficiency and therefore an overall reduced thermodynamic efficiency of the engine.

In addition, overheating of the inducted air may lead to an increased tendency to knock.

Hot air vaporization systems have also heretofore been proposed in which the vaporization is aided by means of a relatively small quantity of auxiliary hot heated air being passed into the intake manifold. Examples of such systems are found in U.S. Pat. Nos. 1,256,976 to Brock; 1,241,155 to Sevigny; 1,420,615 to Webber; 1,364,543 to Callo; 1,565,181 to Manning; 1,143,331 to Strange and Hefrien; and 1,157,189 to Schneider.

These systems generally involve the heating of a small quantity of air by means of the exhaust manifold and the induction of the heated air into the intake manifold, via a tube connection to the intake manifold. These systems have not heretofore been successful in producing the hot air vaporization effectively. That is, to substantially cause total vaporization of the fuel in the air charge without producing performance penalties such as excessively leaning the mixture, overheating of the air in the charge, etc.

It has been determined by the present inventors that the mode of introducing this air into the intake manifold is critical in achieving high efficiency in the hot air vaporization process. That is, if the hot air can be introduced at the proper temperature and flow rate of a given engine configuration, and in the proper manner, complete vaporization can be achieved such as to obviate the performance disadvantages described above resulting from incomplete vaporization without entailing substantially the penalties of the introducing of hot air into the fuel-air mixture.

It is accordingly an object of the present invention to provide an arrangement for producing auxiliary hot air vaporization in an internal combustion engine involving the formation of a fuel-air charge prior to induction into the engine in which maximum fuel efficiency of the hot air induction process is achieved.

Of course, as with any engine component, relative simplicity and troublefree and maintenance free performance is of considerable importance. Most of the systems described in the above patents require manual adjustment and/or control components increasing the complexity of the system such that many are not suited to modern day automotive applications.

It is therefore another object of the present invention to produce such a hot air vaporization system in which maintenance is kept to an absolute minimum and the simplicity of the system lends itself to mass application to the engines of automotive vehicles.

SUMMARY OF THE INVENTION

These and other objects, which will become apparent upon a reading of the following specification and claims, are accomplished by a highly efficient hot air vaporization system involving the induction of a relatively low flow rate of highly heated auxiliary air which is heated by means of being passed through a length of tubing directly exposed to the high temperature exhaust gases or to a hot water heat exchanger and which then is passed through an insulated double wall length of tubing into a metering block which produces a calibrated or controlled flow. This metered flow is directed into a pair of distributor tubes extending from the metering block into a central region within each of a pair of branch cavities within the intake manifold. Each distributor tube is of a length such as to center the flow in each respective cavity as to produce a diffused, balanced flow into each branch of the intake manifold. Each distributor tube has a hole pattern formed along its length so as to produce a uniform flow rate along the distributor pipe tube to produce the diffused flow into the fuel-air mixture in each branch. This produces a highly efficient vaporization process without undue heating of the mixture to thus avoid any substantial degradation in volumetric efficiency or to produce any significantly increased tendency to knock. The optimum temperature and flow rate of the inducted air are determined for a particular engine configuration by precisely measuring the fuel consumption rate at idle and adjusting the length of tubing exposed to the hot exhaust gases or hot water and the orifice or jet size within the metering block to set the proper flow temperature condition at idle. Once determining these necessary parameters, the engine operates at close to optimum performance throughout the operating conditions of the engine.

DETAILED DESCRIPTION

In the following detailed description, certain specific terminology will be utilized for the sake of clarity and a specific embodiment disclosed in accordance with the requirements of 35 USC 112, but it is to be understood that same is not intended to be limiting and indeed should not be so construed inasmuch as the invention is capable of taking many forms and variations within the scope of the appended claims.

Figure 1:
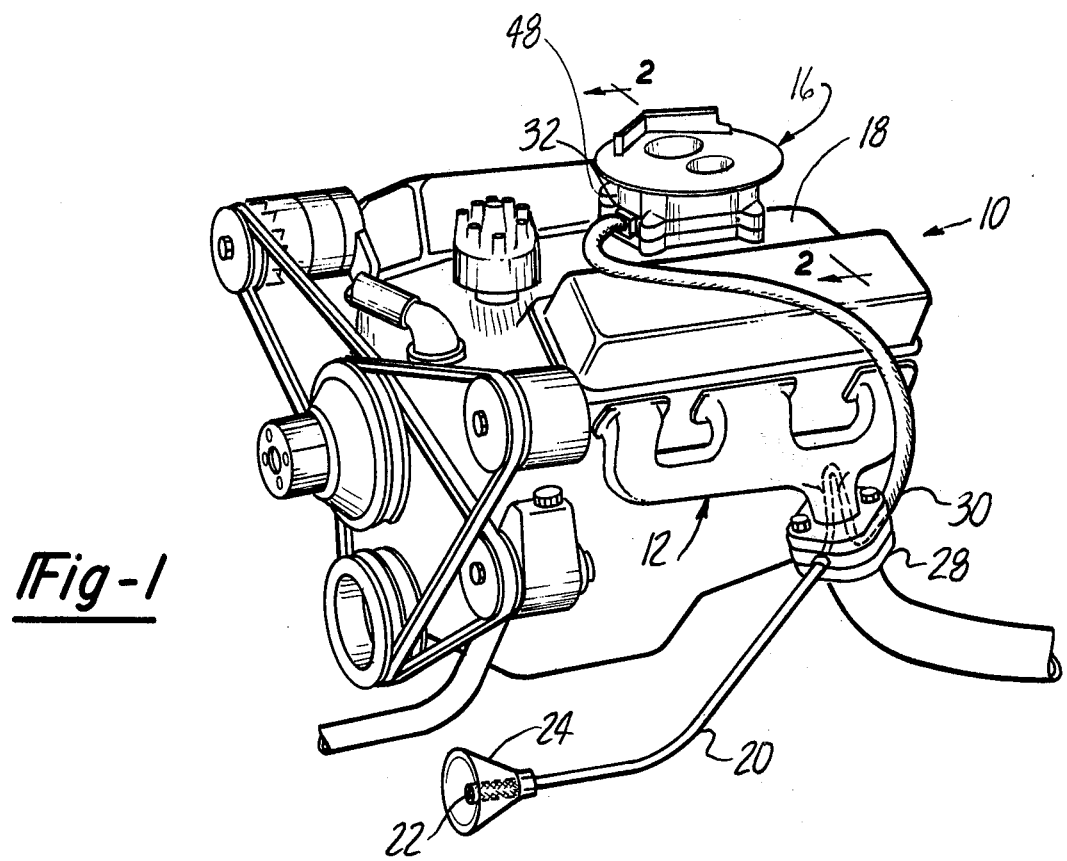
FIG. 1 is a perspective view of an internal combustion engine equipped with an auxiliary hot air vaporization system according to the present invention.

The hot air vaporization system according to the present invention is intended for application to internal combustion engines such as the piston engine 10 shown in FIG. 1, many details of the same not being shown for the sake of clarity.

The engine 10 includes an exhaust manifold 12 with a flange connected exhaust pipe 14 receiving the exhaust gases exhausted from the engine cylinders through the exhaust valve. These gases are then passed into the remainder of the vehicle engine exhaust system as per conventional design.

Figure 2:
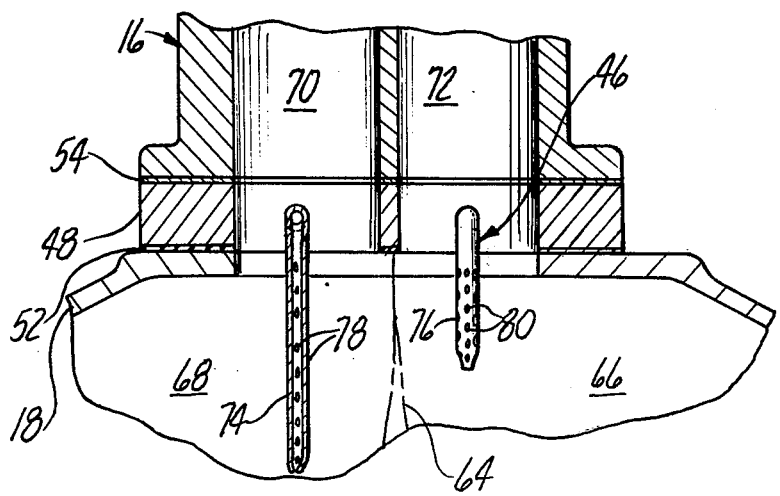
FIG. 2 is an enlarged partially sectional fragmentary view of the distributor tubes in relationship to the carburetor intake manifold.
Figure 4:
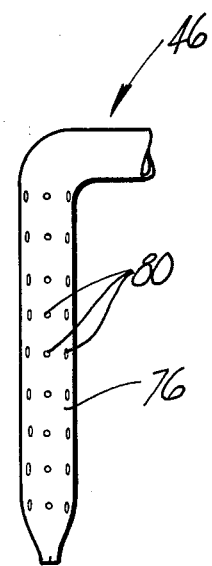
FIG. 4 is an enlarged view of the distributor section of one of the distributor tubes.
Figure 3:
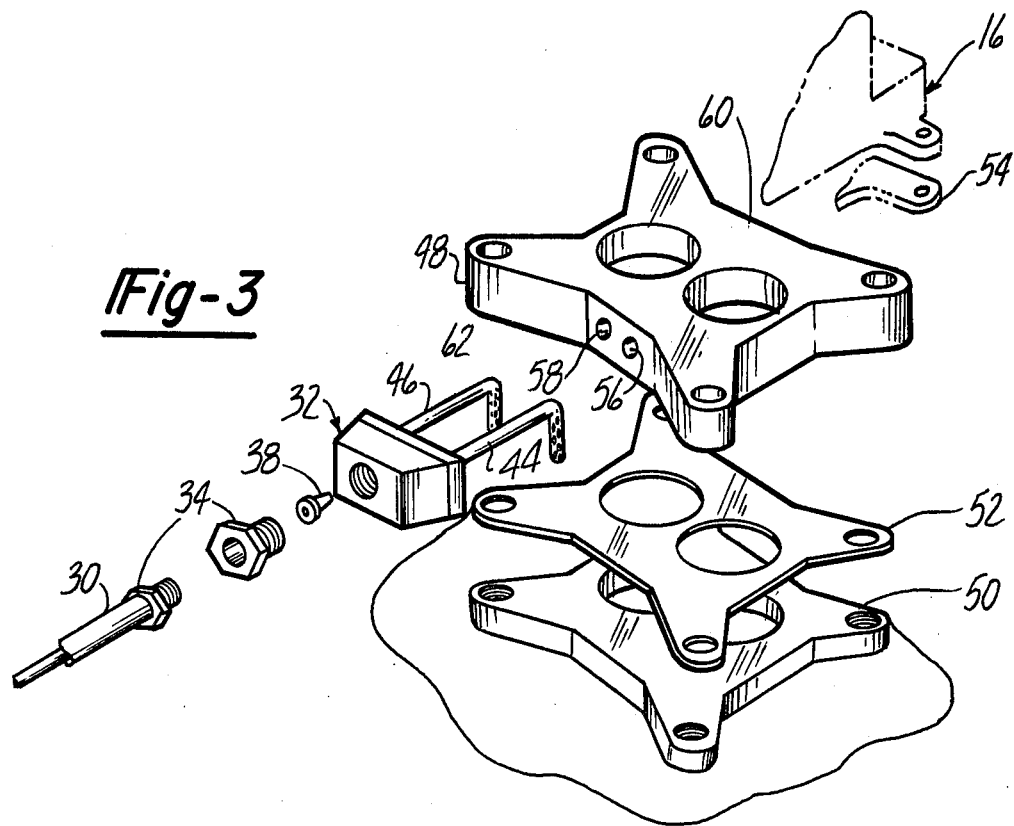
FIG. 3 is an exploded perspective view of the components associated with the distributor tubes and the portion of the intake manifold associated therewith.

The engine 10 also includes a carburetor 16 which is partially shown and which is mounted to an engine intake manifold 18 into which is inducted a fuel-air charge by operation of the carburetor 16. The auxiliary hot air vaporization system includes an air intake passage, taking the form of a length of copper tubing 20 which is opened to receive air after passing through a filter element 22 located at its terminal end with an air scoop 24 also provided to direct the flow of air into the induction inlet tube 20. The air received into the intake tube 20 is heated by passing through a loop of high temperature tubing 26 which is disposed within the exhaust pipe 14 such as to be exposed to the very hot exhaust gases. This high temperature tubing 26 may be of stainless steel construction and is connected via a spacer block 28 to the induction tube 20. The other end of the high temperature tube 26 which, as shown, is looped within the interior of the exhaust manifold 14 and is in communication with an insulated double wall length of tubing 30 which contains an outer tube disposed within an inner tube, with an air space therebetween such that the air once heated in the high temperature tube 26 remains at a relatively elevated temperature as it passes through the length of the double wall tubing 30. The other end of the double wall tube 30 is connected to a metering block assembly 32 as shown in more detail in FIGS. 2, 3 and 5, as by being sealingly received within a pressure fitting 34 which in turn is threaded into a bore 36 formed in the metering block 32.

Figure 5:
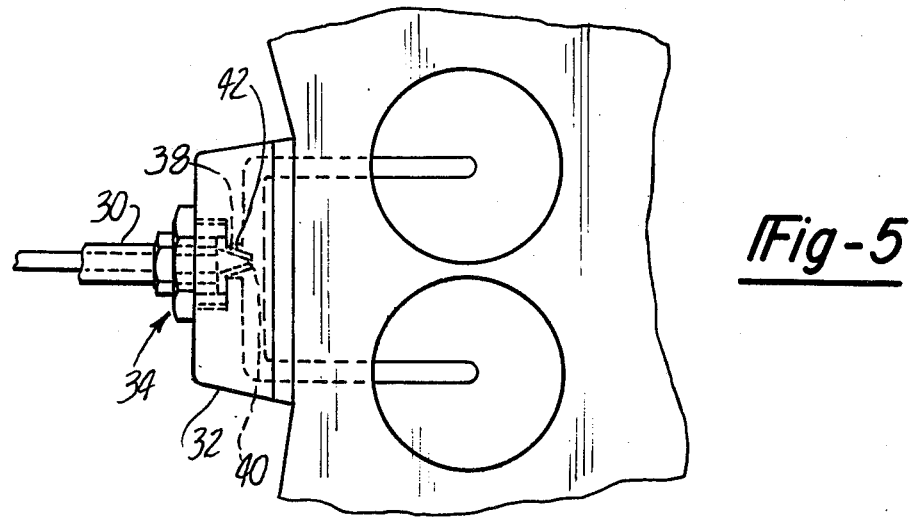
FIG. 5 is a plan view of the metering block and a portion of the spacer plate to which the metering block is mounted, as well as a portion of the distributor tubes.

The flow from the double wall tube 30 is then caused to pass through a metering jet 38 which is disposed so as to cause all of the flow within the double wall tube 30 to pass through an orifice opening 40 formed in the end of the jet 38. The flow that passes into an interior recess 42 machined in the metering block 32 which is in common communication with a pair of distributor tubes 44 and 46 is shown in FIG. 5 such that the total flow is controlled by the size of the orifice 40 formed in the metering jet 38.

The flow is then divided or balanced between the distributor tubes 44 and 46 evenly.

Each of these distributor tubes 44 and 46 is mounted into a spacer block 48 of the type which is commonly used for exhaust gas recirculation connections and is adapted to be mounted to the base of the carburetor 16, atop the mounting surface 50 formed on the intake manifold 18 with intermediate gaskets 52 and 54 normally provided.

The distributor tubes are received in drilled cross passages 56 and 58. Opening 58 exits into a first venturi opening 62. The other passage 56 passes into the second venturi opening 60 such that each distributor tube is located within a respective one of the venturi openings 60 or 62 as shown.

The distributor tubes 44 and 46 are bent downwardly and are of a length such as to extend down into the intake manifold 18.

Intake manifolds of conventional design generally include two main branching passages or cavities, one passage supplying half of the cylinders and the other passage supplying the other half of the cylinders with critical design considerations taken in order to insure distributed flow from the carburetor to the respective cylinder passages.

As described above, there is a principle involved in intake manifold design which dictates that the main divisions in flow take place prior to the encountering of a bend through which the mixture must flow to insure that the bend does not produce a redistribution of the atomized fuel droplets so as to create too lean or too rich mixtures in the cylinders supplied.

Accordingly, most intake manifolds include an initial dividing contour indicated at 64 with a respective branch cavity 66 and 68 which receives the flow through barrels 70 and 72 of the carburetor 16. The passages to the various cylinders branch off from the respective intake manifold branch cavities 66 and 68.

According to the present invention, the hot air inducted is diffusely distributed within each of these bowls at a location generally central within each of these cavities.

Since typically these branch cavities 66 and 68 are offset vertically to allow branch connections to the various cylinders, the distributor tubes 44 and 46 are of differing lengths such as to direct the flow of inducted air as centrally as possible within the respective cavities 66 and 68. Thus, distributor tube 44 is of somewhat longer length than the distributor tube 46.

Each distributor 44 and 46 also includes a terminal distributor portion 74 and 76 which is formed by those portions bent downwardly as shown, so as to be generally aligned with the direction of flow of the mixture into the branch cavities 66 and 68. Along the length of each of the distributor portions 74 and 76 is provided a hole pattern comprised of a plurality of relatively small diameter (i.e., 0.030–0.050 inch diameter) drilled openings indicated generally by numeral 78 in distributor tube 44 and numeral 80 in distributor tube 46. This hole pattern is comprised of a series of drilled passages extending into the sidewall of the distributor portions 74 and 76 and arranged radially about the periphery of each of the distributor portions 74 and 76. In addition, the openings are distributed axially along the length of the tubes and are arranged with a decreasing hole size as the hole pattern approaches the terminal end of the distributor portions 74 and 76. This relationship equalizes the flow of hot inducted air out of the openings 78 and 80 into the fuel-air mixture flow to produce a distributed diffused flow along the length of the distributor portions 74 and 76. It has been found that this arrangement is critical in obtaining efficient vaporization of the fuel by means of the hot air inducted.

The low pressure within the intake manifold 18 acting at the holes 78 and 80 causes induction of auxiliary air into the system. The overall restriction of the tubes, holes, etc. is designed so as to maintain adequate vacuum at idle for proper idle performance of the particular engine design.

The use of a pair of distributor tubes 44 and 46 and their longitudinal arrangement with respect to the air flow, as well as their position substantially centrally located within the intake manifold branch cavities 66 and 68, as well as the aforementioned hole pattern, provides for a very efficient vaporization process as the atomized fuel passes over the efflux flow of hot air.

This arrangement also insures that there is not created an unbalanced flow of hot inducted air such as to tend to create a leaning of the mixture of directed to some of the cylinders and an ineffective heating of inducted air in the remaining portions of the mixture flow. This is believed to be the key to providing successful hot air vaporization system. This latter result is achieved by the use of the central metering block which divides the flow after the correct overall flow rate has been metered and the positioning of the distributor tubes in a central location in respective venturi passages rather than the use of a central hole, as has been heretofore utilized, with such hot air induction systems using a central transversely extending distributor passage as depicted in the prior art systems.

The correct temperature and pressure and flow rates are best determined by empirical methods since analytic methods would not be feasible due to the infinite and subtle variations in the configuration of each engine design and installation. Such proper conditions are relatively easily arrived at by the use of a high precision liquid flow meter which is installed to precisely measure the fuel consumption of the engine at idle, by trying various jet sizes in the metering block and varying the length of high temperature tubing within which is disposed the hot exhaust gases. There will be noted a marked improvement in the fuel consumption rate at flow rates and temperatures substantially at optimum values of these parameters. Either of these parameters may be determined separately such that by determining the jet and tubing dimensions producing the optimum flow rate and temperature, the same tubing length and jet size may then be utilized for engine configurations and installations similar in type.

As a typical example, 3/16 I.D. tubing was utilized with a 0.062 in diameter jet orifice.

While some variation in the effectiveness of the system will be encountered at different ambient temperatures, the use of the insulated lead in tube 30 minimizes the effect of ambient conditions and at any event the operating efficiency of the engine is improved substantially under all ambient conditions, albeit under certain ideal conditions, the engine would operate at an optimal efficiency.

The tubing may simply be copper tubing except for the heating tube 26 which is preferably as noted constructed of a high temperature resistant material such as stainless steel so as to withstand the hot exhaust gases without serious deterioration and corrosion.

Thus, it can be seen that no adjustments or controls are necessary to be operated by the driver of the vehicle and further that no maintenance operation other than a very occasional replacement of the filter element 22 is required, nor are any difficult maintenance adjustments necessary once a design has been arrived at in a particular engine since no further variations of the flow rate, temperatures, etc. need be carried out. This results from the empirical determination being carried out at engine idle, since increased manifold pressure at greater throttle openings reduce the proportion of inducted auxiliary air.

Figure 6:
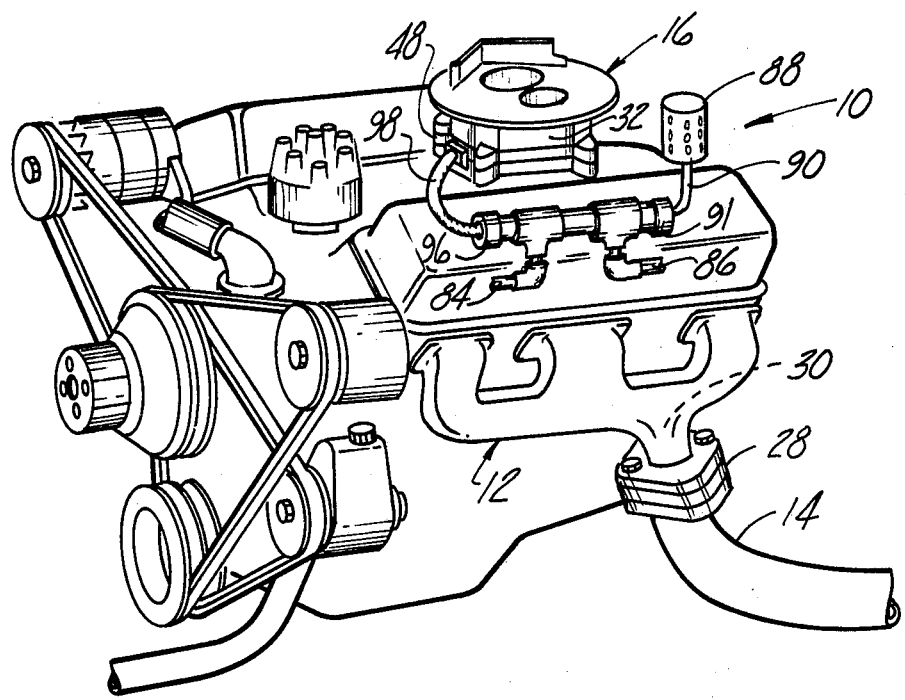
FIG. 6 is a perspective view of an internal combustion engine equipped with an alternate form of the heat exchanger for the auxiliary hot air vaporization system.
Figure 7:
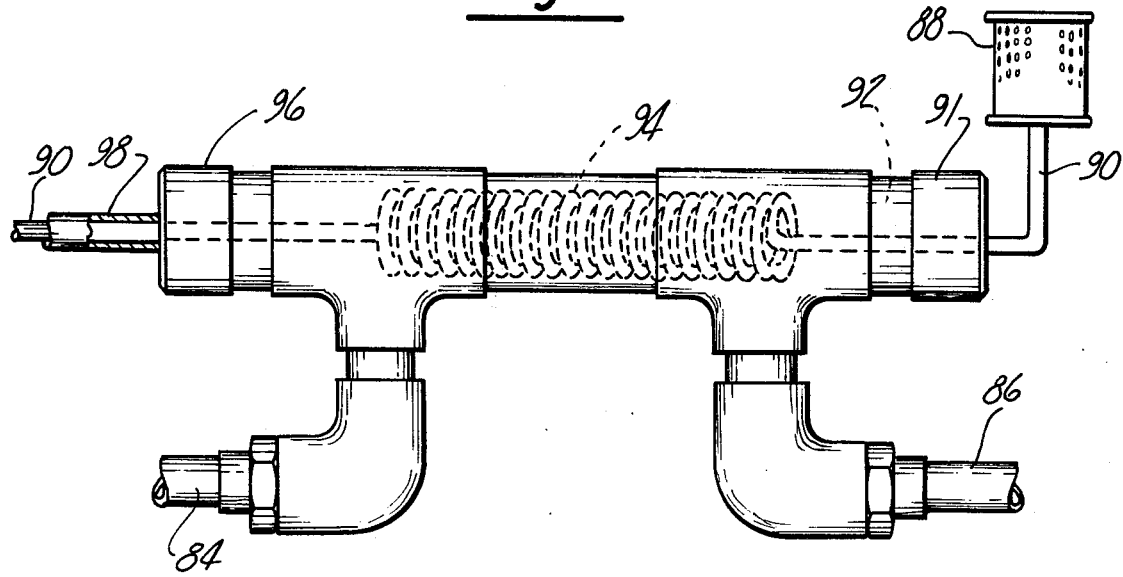
FIG. 7 is an enlarged longitudinal view of the heat exchanger shown in FIG. 6.

In order to minimize variations in the temperature of heated auxiliary air with differing ambient temperatures, a hot water heat exchanger may be utilized as shown in FIGS. 6 and 7 to heat the auxiliary air.

This includes a heat exchanger housing 82 which receives coolant from the engine cooling system via an inlet hose 84 which returns through an outlet hose 86. These could be bypassed from the heater hoses or separate hoses from the engine cooling system.

The auxiliary air is drawn in through an air filter 88, shown as of a canister type in FIG. 6, with an air induction tube 90 receiving the air drawn in through the filter 88.

As best seen in FIG. 7, the induction tube 90 passes through an end cap 91 sealing one end of the heat exchanged housing 82 and into the interior space 92. The induction tube 90 is wound onto a coil 94 occupying the interior space 92 before passing out the other end cap 96.

The induction tube 90 is covered with an insulator jacket 98 to maintain the air temperature as in the above-described embodiment.

Suitable fittings 100, 102 are provided to join the hoses to the heat exchanger housing 82 so as to cause hot engine coolant to circulate through the interior space 92.

The remainder of the system is the same as in the above-described embodiment.

The means for heating the inducted air has been found to be more consistent in maintaining an even temperature of the inducted air for more consistent performance in varying ambient conditions, albeit the air may not be heated to as high a temperature by this approach. It has been found that good performance may be achieved with inducted air temperatures on the order of 200° F. or higher.

A supplemental electric resistance heat could also be used during cold start up or as a supplement to engine coolant.

The embodiments of the invention in which an exclusive property or privilege is claimed are defined as follows:

1. A hot air vaporization system for an internal combustion engine of the type including a carburetor having venturi passages, an intake manifold having respective branch cavities, each receiving a fuel-air mixture from a respective carburetor venturi passage for induction into the engine, said hot air induction system comprising:
    an air induction type open to receive air;
    heating means heating the inducted air passing through said air induction tube;
    metering block means and means connecting said air induction tube to said metering block means and further including means for metering the air flow therethrough;
    a pair of distributor spaced tubes each connected to said metering block means and receiving said metered air flow therefrom, each of said distributor tubes extending into said intake manifold through respective central regions of each of said intake manifold branch cavities immediately below said venturi passages and each of said distributor tubes having ends disposed in said intake manifold and further including means for creating a diffuse flow of heated air from each of said distributor tubes into each of said intake manifold branch cavities, said means including a multiplicity of spaced openings formed about each of said distributor tubes such as to cause a diffuse outward flow of heated air from said tubes into said central regions of said intake manifold branch cavities;
    whereby said diffused flow of hot air into said central regions efficiently causes vaporization of the fuel in said fuel-air mixture received into said engine intake manifold.

2. The vaporization system according to claim 1 wherein said means connecting said meter block means and said air induction tube comprises an insulated tube, whereby cooling of said heated air is minimized during said passage to said metering block means.

3. The vaporization system according to claim 1 wherein each of said multiplicity of distributor tube openings comprises a hole pattern comprised of holes arranged about the periphery of said distributor tube and further arranged axially along the length thereof, said holes being of varying diameter with increasing size holes towards the end of said distributor tube.

4. The vaporization system according to claim 1 wherein each of said distributor tubes is of differing length and extend into respective intake manifold branch cavities, each of said distributor tube lengths being such as to approximately be centered in said respective branch cavities.

5. The vaporization system according to claim 1 wherein said induction tube includes a filtering means located at the open end of said induction tube.

6. The vaporization system according to claim 4 wherein each of said multiplicity of distributor tube openings comprises a hole pattern comprised of holes arranged about the periphery of said distributor tube and further arranged axially along the length thereof, said holes being of varying diameter with increasing size holes towards the end of said distributor tube.

7. The vaporization system according to claim 6 wherein said means connecting said meter block means and said air induction tube comprises an insulated tube, whereby cooling of said heated air is minimized during passing into said metering block means.

8. The vaporization system according to claim 7 wherein said induction tube includes a filtering means located at the open end of said induction tube.

9. The vaporization system according to claim 1 wherein said metering block means includes a jet orifice receiving all of said heated air flow.

10. The vaporization system according to claim 1 wherein said heating means comprises heater tube means extending into the engine exhaust system so as to be exposed to high temperature exhaust gases.

11. The vaporization system according to claim 1 wherein said heating means includes a heat exchanger housing having an interior space, and means for directing hot engine coolant through said heat exchanger interior space and further including a length of said induction tube passing through said heat exchanger interior space to thereby heat said auxiliary air passing therethrough.

* * * * *

UNITED STATES PATENT AND TRADEMARK OFFICE
CERTIFICATE OF CORRECTION

PATENT NO. : 4,167,166
DATED : 9/11/79
INVENTOR(S) : William L. Varner & Billy R. Willis It is certified that error appears in the above-identified patent and that said Letters Patent are hereby corrected as shown below:

Column 7, line 53, "type" should be --tube--.

Signed and Sealed this

Eighth Day of April 1980

[SEAL]

Attest:

SIDNEY A. DIAMOND

Attesting Officer

Commissioner of Patents and Trademarks